W. C. ANDREWS.
METHOD OF PRODUCING GUN BARRELS.
APPLICATION FILED FEB. 12, 1917.
1,324,289.
Patented Dec. 9, 1919.
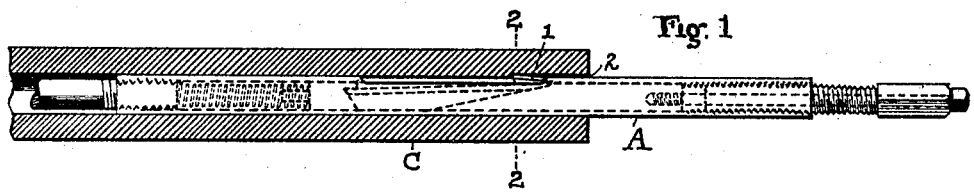
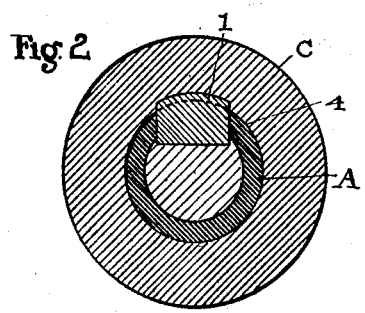
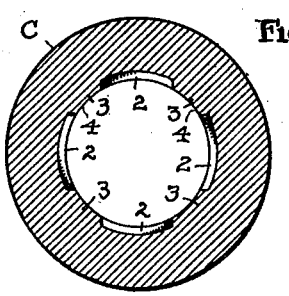
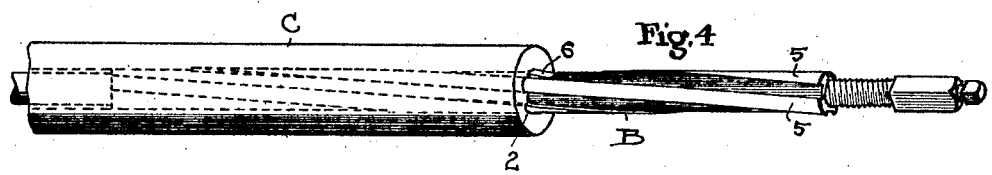
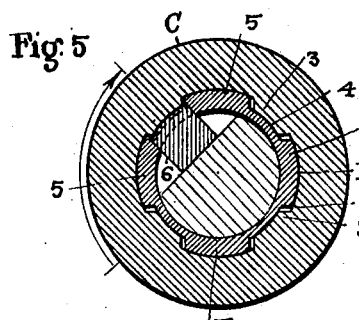
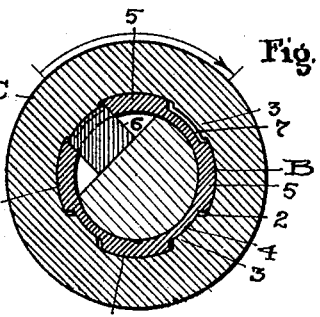
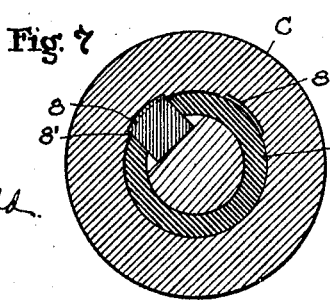
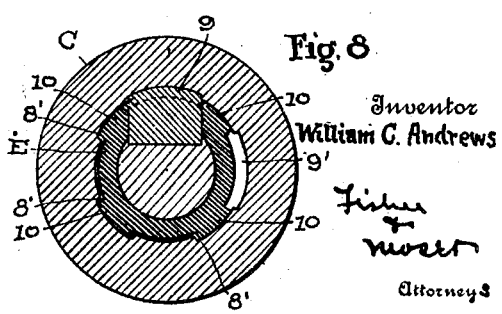
Inventor
William C. Andrews
Fisher & Moett
Attorneys
Witness
J. C. Harrold

UNITED STATES PATENT OFFICE.

WILLIAM C. ANDREWS, OF CLEVELAND, OHIO, ASSIGNOR TO HARRY A. AUER, OF CLEVELAND, OHIO.

METHOD OF PRODUCING GUN-BARRELS.

1,324,289.  Specification of Letters Patent.  Patented Dec. 9, 1919.

Application filed February 12, 1917. Serial No. 148,259.

*To all whom it may concern:*

Be it known that I, WILLIAM C. ANDREWS, citizen of the United States, residing at Cleveland, in the county of Cuyahoga and State of Ohio, have invented certain new and useful Improvements in Methods of Producing Gun-Barrels, of which the following is a specification.

This invention appertains to a method of producing gun barrels, the general object being to rifle and smoothly enlarge the bore of a gun barrel to a predetermined caliber by a series of cutting and centering actions, substantially as herein shown and described and more particularly pointed out in the claims.

In an application filed by me January 11, 1917, Ser. No. 141,744, I describe a method of producing a smoothly rifled gun barrel of any desired caliber without resorting to reaming operations. Briefly, that method involves a series of cutting actions moving on extended coinciding spiral lines to different depths over all the colateral surfaces within the gun barrel bore, beginning with a rough bore and ending with a smoothly finished and rifled bore of the exact caliber desired. The present invention is predicated on the method described in said application, but is distinguished therefrom in that the steps of planing the spiral lands and the cutting of the spiral grooves are not started until one or the other is completely finished, and in that separate centering and cutting instrumentalities are employed successively for the separate groove and land cutting operations, and in that the separate groove and land cutting actions proceed with exact precision at uniform distances from and parallel with the exact longitudinal axis of the bore throughout all the steps involved.

In the accompanying drawings, Figure 1 illustrates a short section of a gun barrel as it appears at the start of operations with a draw cutting tool introduced part way therein and in the act of removing a portion of the stock to produce a spiral groove, and Fig. 2 is a transverse section on line 2—2, Fig. 1, but greatly enlarged. Fig. 3 is a view on the same scale as Fig. 2, showing a cross section of a gun barrel as it appears subsequent to grooving operations. Fig. 4 is a perspective view of the grooved gun barrel with a second tool centered in position to begin the land planing operation. Fig. 5 is a cross section of the gun barrel and the land planing tool therein and showing the cutter expanded and in the act of planing the land surface between two grooves while the tool is held absolutely central by the four contact ribs seated in the four grooves produced by the first tool. Fig. 6 corresponds to Fig. 5, except that it shows the tool working on the second land and as occurs after the barrel has been given a quarter rotation subsequent to the planing action on the first land and the removal of a shaving therefrom. This shaving in actual practice is very thin, and the showing is magnified to indicate as clearly as possible the place where the stock is removed rather than the amount of stock removed. Figs. 7 and 8 are cross sections corresponding in a way to Figs. 2 and 5, respectively, except that these two views show a reversal of the steps taken in said Figs. 2 and 5, that is, these views illustrate the planing of the land as preceding the cutting of the grooves but with both tools held absolutely central to perform their respective functions.

In practising the method, I use two cutting tools A and B, respectively, substantially as shown in Figs. 1 and 4, although it must be understood that the invention is not absolutely dependent upon any particular form of tool, instrument or machine, but is best practised by the aid of tools and a machine. Thus, the ordinary or well known type of rifling machine may be used, wherein a draw cutting tool such as A, is reciprocated and rotated within the gun barrel bore to produce a series of radial grooves spirally in the curved surface of the bore. That is, assuming that four grooves are to be made, the barrel is held stationary and the tool drawn through the same to produce a light cut for the first groove. Then the barrel is rotated ninety degrees while the tool is out of the barrel and the same cutting action is repeated with the same depth of cut to produce a second groove. Then the barrel is again rotated ninety degrees and the cutting action repeated to produce the first cut for the third groove. The first cut for the fourth groove is made in the same way following further rotation of the barrel exactly ninety degrees. Four light cuts have been taken at four radial places the full length of the barrel, and now the cutter is expanded to deepen the groove and the same cycle of cutting actions repeated. In fact, the mode of operation as stated proceeds, cycle after cycle, until four grooves of uniform depth and the requisite depth are produced. Moreover, the grooves are cut spirally in the barrel by rotating the tool a given number of times while it is being reciprocated, all according to a general practice which includes a preliminary reaming of the bore to caliber, but I do not ream the bore of the gun to caliber before proceeding with such grooving or rifling operations.

Instead, one of my objects is to eliminate reaming of the bore by bringing the gun barrel to the rifling machine with its bore still of smaller diameter than the bore of final caliber, and either groove this bore at equi-distant radial places and on spiral lines to the exact caliber desired and groove the bore again to a greater depth radially between the first cuts to produce the rifling grooves, or as an alternative to groove the bore at equi-distant radial places to produce rifling grooves of full depth and then to plane the uncut portions spirally between said grooves to the exact caliber desired. In either case, my method involves constant uniform centering of the cutting tool in its repeated cutting movements at all radial points of the gun bore while rifling the bore and also while planing the bore to caliber, and the surfaces produced by the cutting action of the first tool are burnished by the body of the second tool in its movement through the bore.

Referring first to Figs. 1 to 6, inclusive the method consists in cutting a series of grooves radially and spirally in the internal wall or bore of the gun barrel by reciprocating the draw cutting tool A or its equivalent through the barrel while imparting a rotative movement thereto, such cutting actions being repeated in cycles as hereinbefore described. But according to my invention cutting of each radial groove by cutter 1 begins in a bore having a smaller diameter than the caliber of final desire, and the bore may be said to be in a roughly-bored state as compared with the reamed bore more commonly operated upon. Moreover, the cutting tool, which comprises a cylindrical body, is designed to fit snugly for slidable movement within this reduced bore, as the less lateral play in the tool the more accurate the cutting, especially as to depth and because all the grooves should be of uniform depth and concentric with the bore axis. Thus, in the making of a single groove the encompassing wall of the bore centers and guides tool A so that it must travel without lateral movement and deviation from a straight line, and the same result follows in producing a series of spaced grooves because the lands or uncut segmental portions left between the grooves sustain the cylindrical body without lateral play in the same way, notwithstanding that each groove of the series is cut by repeated draw-cutting operations as described. When all four spiral grooves 2 have been cut to their full depth and a uniform depth, as illustrated in Fig. 3, four lands or ribs 3 extend radially inward and the curved surface 4 of each land remains unaltered and define a bore having a diameter which in this case is smaller than the bore of final desire and need.

The next step, therefore, is to bring the bore to actual caliber, which is accomplished by substituting a second cutting tool B for tool A, but still using the same rifling machine and general mode of operation as before except that the cutting action is transferred to the surface 4 of the lands 3 and the centering and guiding action for the tool is shifted to the bottom of the grooves 2. To serve these purposes, tool B comprises a cylindrical body having radial ribs 5 extending spirally therearound and corresponding exactly to the lead or pitch of the spiral grooves 2 in the gun barrel bore so that the tool may fit snugly therein and have slidable and turning movements exactly as in rifling operations. In this way the body ribs 5 engage and burnish the smoothly finished bottoms of the grooves 2 and center the tool and prevent lateral movement thereof relatively to the surrounding wall of the bore from the beginning of land planing operations and constantly thereafter until the bore is smoothly and uniformly enlarged to the exact caliber desired. The draw cutter 6 of tool B is located between two ribs 5 and extends through the body to cut each land surface 4 successively, following turning movements of the barrel C; and Fig. 5 shows tool B in operating position within barrel C and the cutter 6 in the act of planing the first land. In Fig. 6, the barrel C is shown as turned exactly ninety degrees relatively to the position of the barrel during the first cut, and this view also discloses the space 7 produced between the planed land 3 and the cylindrical body of tool B after such new placement of the barrel. Of course, the showing is greatly magnified as only a very thin shaving is removed each time, but this space gradually increases as repeated cuttings are made, not only at this particular land but the other lands as well. Consequently, a tool without ribs 5 or their equivalent would soon shift its position laterally within the bore and cutting of the bore to caliber would be on eccentric lines instead of concentric with the circle outlining the base of the grooves, a fault which would also produce lands of varying height or thickness. By my method the grooves are cut to a uniform depth and the lands to a uniform height and the collateral groove and land surfaces throughout the entire bore are smoothly planed on coinciding spiral lines so that no transverse irregularities are produced at any point longitudinally of the bore. Therefore the course of the bullet follows the spiral lines of each and every cut and the bore does not foul as quickly as the product of the method in general use, while the rifling lands have longer life and are more effective for longer periods of use than under the old methods of production.

In practising my method, both tools are caused to travel on the same longitudinal axis,—the true axis of the bore, by centering the second tool for travel in the channels cut by the first tool, and this action or step is a vital one whether the rifling operation precedes or succeeds the land planing or bore enlarging operation. In Figs. 7 and 8, I illustrate the manner in which the land portion may be planed to caliber preceding rifling operations, using two draw-cutting tools D and E, respectively, and practising the same mode of operation as hereinbefore described except as to sequence of the steps involving rifling and land planing. Thus, in Fig. 7 a planing tool D is shown having a diameter corresponding to the rough bore of the gun barrel C, that is, the tool fits snugly in the rough or reduced bore. The radial position of the expanding cutter 8 is such that in each cycle of cutting operations a thin ribbon of metal is removed from the bore wall spirally the length thereof at equi-distant radial places therein and shallow channels 8′ are formed. These places correspond to the radial position occupied by the radial lands of the barrel shown in Fig. 5, and cutting proceeds until the channels reach a uniform depth corresponding to the diameter or caliber of bore wanted, measured across from the curved bottoms of two diametrically opposed channels. The tool D is now withdrawn and a second tool E substituted having a series of radial ribs 10 spirally thereon which are adapted to occupy the channels 8′ in the rough bore with a close traveling fit against the curved surfaces at the bottom of said channels, in this way centering the second tool E for travel exactly on the same longitudinal axis traversed by the first tool D. The second tool E also embodies an expanding draw cutter 9 which is radially positioned between two of the ribs 10 so as to produce a rifling groove thereat and also similar grooves between the remaining ribs 10 upon practising the mode of operation involving a series of cutting actions in successive cycles as hereinbefore described. In rifling, the tool E is constantly centered in its travel by contact of its ribs 10 with the curved bottom of the channels formed at the beginning in the rough bore but which finally become the land surfaces, and Fig. 8 shows this working relation of the tool E in a barrel C having radial channels 8′ cut by the first tool and also one rifling groove 9′ as it appears after the first rifling cut and while the cutter 9 is producing a like groove in another radial place in the wall of the bore. The repeated movements of tool E with its ribs 10 engaging the curved surfaces at the bottom of channels 8′ and which represent the actual caliber of bore, effects a burnishing of such surfaces and a highly-finished product. The depth of cut is greatly magnified in said figures to show the space formed between the body of the cutting tool E and the wall of the bore and more clearly define the radial points of support for the tool in its travel through the bore.

What I claim is:

1. A method of producing a rifled gun barrel, consisting in first cutting a series of radial grooves spirally in the wall of the bore of the gun barrel, and subsequently removing the material in the wall between each pair of adjacent grooves to a predetermined width and depth by reciprocal spiral movements of a cutting tool while centering the tool for travel in the grooves resulting from the first operation.

2. A method of producing a rifled gun barrel, consisting in rifling the bore of the gun barrel and in enlarging and smoothing the bore of the gun barrel to a predetermined caliber by separate groove and land cutting actions moving spirally at the same pitch at successive intervals and with exact precision at uniform distances from and parallel with the exact longitudinal axis of the bore.

3. A method of producing a rifled gun barrel, consisting in planing the internal surfaces of a gun barrel on spiral lines at equi-distant radial points until a series of grooves of uniform depth have been produced, and then reciprocating a cutting tool in sliding engagement with the bottoms of said grooves and repeating said groove planing actions in the surfaces intermediate said grooves.

4. A method of producing a rifled gun barrel, consisting in reciprocating a cutting tool through the bore of the gun barrel and planing the bore surfaces at equi-distant radial points therein on extended spiral lines while maintaining the tool in slidable engagement without lateral movement with the uncut bore surfaces, and then reciprocating a second cutting tool through the unfinished bore and planing the remaining uncut bore surfaces to a different depth but on identical spiral lines while maintaining the tool in slidable engagement without lateral movement with the previously cut surfaces.

5. A method of producing a rifled gun barrel, consisting in grooving the bore surfaces of the gun spirally at equi-distant radial points to produce rifling grooves of uniform depth and upon completion of said grooving operations to plane the uncut surfaces between said grooves by repeated spiral planing movements coinciding with the spiral of said grooves until a uniform caliber of bore is obtained.

6. A method of producing a rifled gun barrel, consisting in planing the bore surfaces of the gun barrel at equi-distant radial points and spirally until a series of rifling grooves of uniform depth have been produced, and then continuing the same planing actions over the uncut surfaces of the bore while centering the planing tool for travel in the bottoms of said grooves until the bore is smoothly enlarged to the desired caliber.

7. A method of producing a rifled gun barrel, consisting in reciprocating a rotating cutting tool through the rough bore of a gun barrel and planing the bore surfaces at equi-distant points successively on coinciding spiral lines while centering the tool by constant contact with the uncut surfaces of the bore until a series of rifling grooves of full and uniform depth have been obtained, and then reciprocating and rotating a second tool through the rifled bore in radial contact with the bottom of said rifling grooves and planing the uncut bore surfaces successively on identical spiral lines until the bore is smoothly enlarged to a given caliber.

8. A method of producing a rifled gun barrel, consisting in introducing a cutting tool centrally within the bore of a gun barrel in slidable contact radially with the bore surfaces and removing thin shavings at different radial points of the bore surfaces by successive cutting actions proceeding lengthwise of the bore on spiral lines until a series of rifling grooves of uniform depth have been produced, and then introducing a second cutting tool centrally within the rifled bore in slidable contact radially with the bottoms of the rifling grooves and repeating said cutting actions over the uncut bore surfaces until a smooth rifled bore of predetermined caliber is obtained.

Signed at Cleveland in the county of Cuyahoga, and State of Ohio, this 29th day of December, 1916.

WILLIAM C. ANDREWS.